April 25, 1961     D. C. SANKO     2,980,955
APPARATUS FOR FORMING HOLLOW ARTICLES
FROM THERMOPLASTIC MATERIAL
Filed Jan. 26, 1959     3 Sheets-Sheet 2
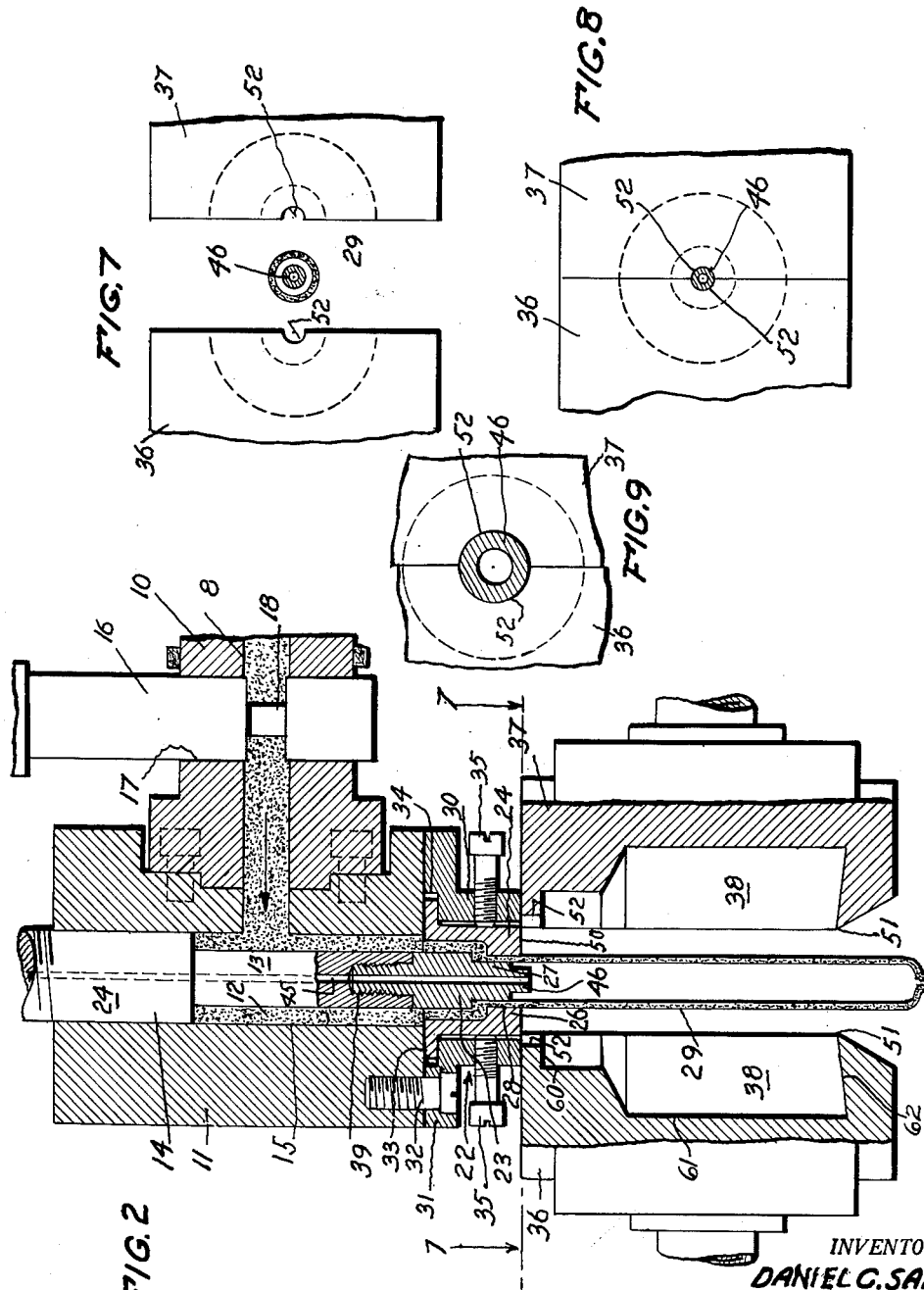
INVENTOR.
DANIEL C. SANKO
BY Louis C. Smith
ATTORNEY

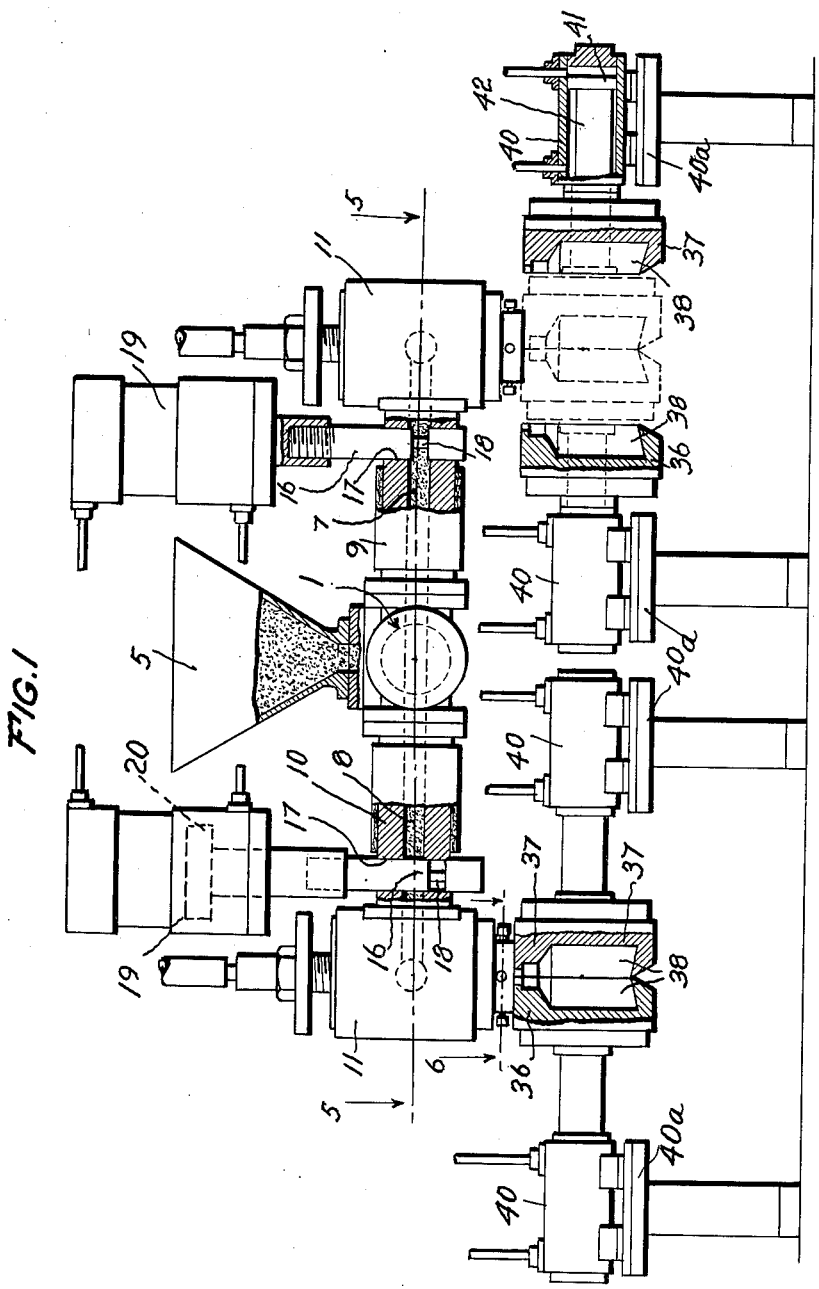

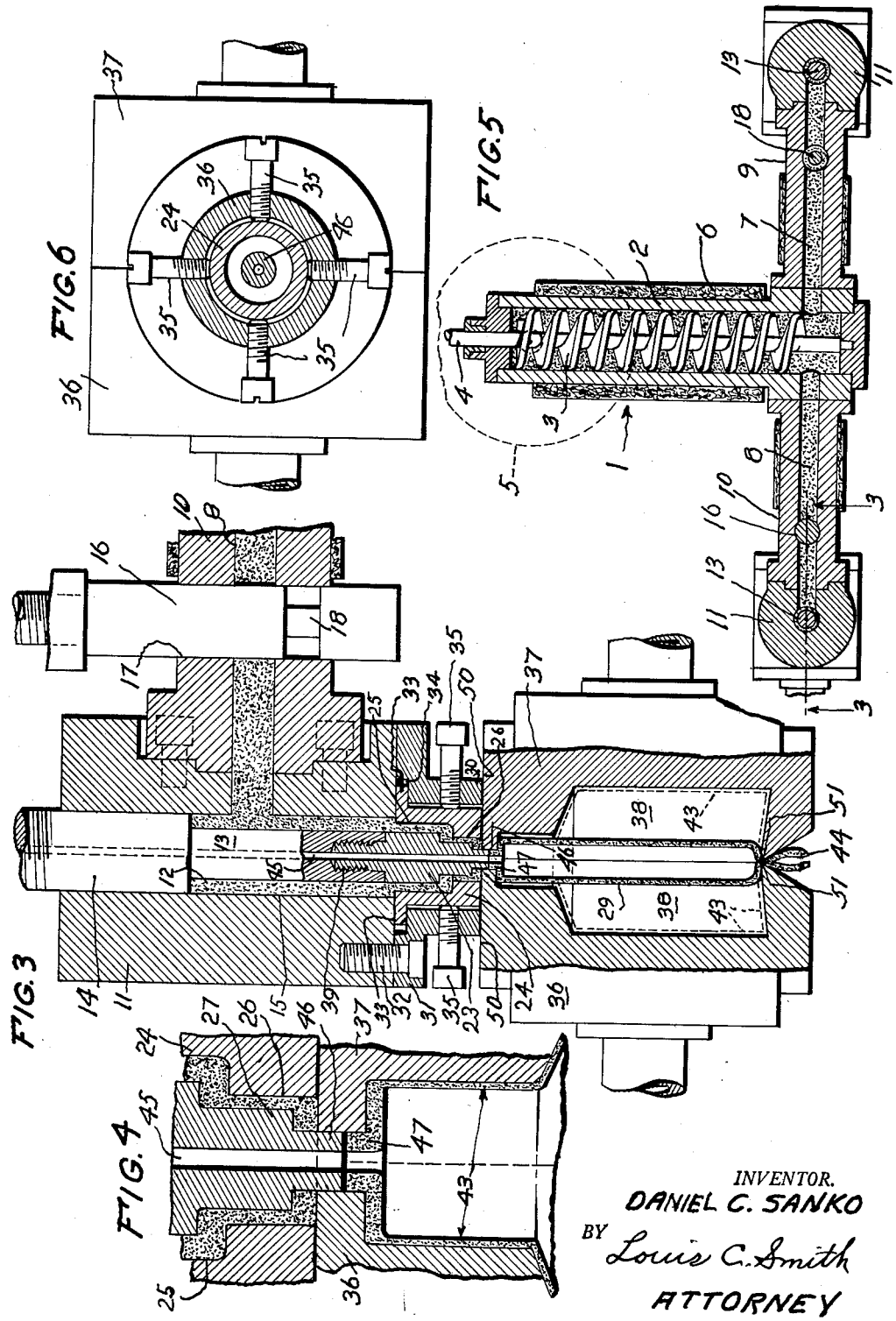

United States Patent Office 2,980,955
Patented Apr. 25, 1961

2,980,955
APPARATUS FOR FORMING HOLLOW ARTICLES FROM THERMOPLASTIC MATERIAL
Daniel C. Sanko, 215 A St., Boston 10, Mass., assignor of one-half to Leslie J. Kovach, Brookline, Mass.
Filed Jan. 26, 1959, Ser. No. 789,135
1 Claim. (Cl. 18—5)

This invention relates to an apparatus for forming hollow articles (of which bottles, jars, and the like are examples) from thermoplastic material and more particularly to that type of apparatus which includes a plasticizing unit by which the thermoplastic material in solid condition is converted into a moldable plastic condition and means to force the thermoplastic material while in such plastic condition to and through an extrusion opening of an extrusion head to produce a preform in tubular shape and deliver such preform into an open two-part mold.

In this type of apparatus, when the preform has been delivered into the open mold, the latter is closed to cut off the extruded section of tubular thermoplastic material from the parent body of such material, after which air under pressure is delivered to the interior of such extruded tubular section of thermoplastic material, thereby to expand such tubular section to conform to the shape of the mold cavity in the closed mold and thereby to produce the hollow article of the desired shape.

The present invention relates particularly to the extrusion head portion of the complete apparatus.

In the drawings wherein one embodiment of the invention is shown,

Fig. 1 is a side view of an apparatus embodying the invention with portions thereof shown in section;

Fig. 2 is an enlarged sectional view on the line 3—3, Fig. 5, showing the mold open;

Fig. 3 is a similar sectional view showing the mold closed;

Fig. 4 is an enlarged sectional view through the extrusion head and upper part of the mold on the line 3—3, Fig. 5;

Fig. 5 is a section on the line 5—5, Fig. 1;

Fig. 6 is an enlarged sectional view on the line 6—6, Fig. 1;

Fig. 7 is a section on the line 7—7, Fig. 2, showing the mold open;

Fig. 8 is a similar sectional view showing the mold closed; and

Fig. 9 is an enlarged view of the central portion of Fig. 8.

Referring now to the drawings, 1 indicates a plasticizing unit of usual construction by which the thermoplastic material in solid form is converted into a plastic condition. This unit comprises a cylinder 2 in which is located a feed screw 3 which is driven by a driving shaft 4. The solid thermoplastic material is delivered into the cylinder through a hopper 5, and the cylinder is provided with an exterior heating unit 6 by which the thermoplastic material is heated as it is fed through the cylinder, thereby reducing it to a plastic condition.

The delivery end of the cylinder communicates with two passageways 7 and 8 formed in two tubular elements 9 and 10. Each tubular element extends to a body member 11 which is provided with an interior chamber 12, and the passage through each tubular element 9 or 10 leads into the chamber 12 in the corresponding body member 11.

An extrusion head is detachably secured to the bottom of each body member 11 as will presently be described. Each of the passages 7 and 8 is provided with a valve by which the passage may be closed or opened. While any suitable valve for this purpose may be employed, there is shown a valve of the piston type which is indicated at 16. Each tubular member 9 and 10 is provided with a transverse opening 17 in which the piston valve 16 operates. Each piston valve is provided with a portion 18 of reduced diameter; and when the piston valve is moved into the position shown in Fig. 2 with the portion 18 of reduced diameter registering with the passage 8, the valve will be in its open position and plastic material from the cylinder 2 may be forced through the passage into the chamber 12 of the corresponding body member. When, however, the piston valve is moved into the position shown in Fig. 3 in which the portion 18 of reduced diameter is out of register with the passage 8, then said passage will be closed. Any suitable means may be employed for giving each piston valve its opening and closing movement. One means may be in the form of an air cylinder 19 in which operates a piston 20 that is connected to the valve so that the movement of the piston in the cylinder will operate to open and close the corresponding valve.

Each body member 11 carries a mandrel 13, the upper end 14 of which forms the top of the chamber 12 as shown in Fig. 2. This mandrel extends through the chamber 12 and forms therewith an annular space 15 with which the passageway 7 or 8 communicates.

The extrusion head for each mold is indicated generally at 22. The mandrel 13 in each body member 11 extends through the chamber 12 as stated above and some distance below said body member, as indicated at 23. Detachably secured to the bottom of the body member 11 is a bushing 24 into which the end 23 of the mandrel extends. The upper portion 25 of the opening through the bushing is shown as having a larger diameter than the lower portion 26, and the portion 27 of the mandrel extends into said lower portion 26 of the opening through the bushing. Said portion 27 of the mandrel forms with the portion 26 of said opening an annular extrusion opening 28 through which the plastic material is extruded to produce a preform in the shape of a tubular section 29 having dimensions determined by the dimensions of said extrusion opening.

The bushing 24 may be detachably secured to the body member 11 in any suitable way. As herein shown, it is held in place by an annular retainer member 30. Said retainer member is provided at its upper end with an outwardly extending flange 31 which is secured to the bottom of the body member 11 by means of screws 32. The bushing 24 is provided at its upper edge with a flange portion 33 which occupies a recess 34 formed in the top of the retaining member. To provide for adjusting the bushing member laterally in order to bring it into proper alignment, the opening through the retaining member is made slightly larger than the diameter of the bushing, as shown clearly in Figs. 2 and 3. The retaining member carries a plurality of adjusting screws 35 which engage the side wall of the bushing; and by adjusting these screws, it is possible to move the bushing slightly in a lateral direction, thereby to bring the bushing into axial alignment with the end 23 of the mandrel.

The lower section of the mandrel, including the portion 27 is detachable from the body thereof so that any one of several lower sections having portions 27 of different diameters may be used depending on the internal diameter which it is desired that the extruded tube section 29 should have. As herein shown said detachable section 23 is provided at its upper end with a screw-threaded stem 39 which is screwed into a screw-threaded socket in the lower end of the body of the mandrel.

Since the bushing 24 is detachably mounted on the body member 11, any one of a plurality of bushings each having an opening of a different size in its lower portion 26, may be used depending on the external diameter which it is desired that the extruded tube section should have.

It will be noted that the portion 27 of the mandrel terminates at a point within the opening in the portion 26 of the bushing 24 and above the bottom of the bushing, and that the mandrel is provided with a tip portion 46 which will be again referred to, and which has a diameter smaller than that of said portion 27 and thus smaller than the extrusion opening. Said tip extends entirely through the bushing 24 and to a point slightly below the latter.

The mold which is used for molding the article is a two-part mold of usual construction. There are two of these molds, one for each extrusion head, and each mold includes the two parts 36 and 37. Each mold part is formed with a mold cavity 38; and when the mold is in its closed condition, as shown in Fig. 3, the two mold cavities register with each other and produce together a single mold cavity in which articles to be produced can be accurately blow molded. In the construction shown, the single mold cavity has a top wall 60, a side wall 61, and a bottom wall 62.

Any suitable means may be provided for moving the two parts of each mold between the open condition shown in Fig. 2 and the closed condition shown in Fig. 3. One device for this purpose which is quite commonly used is an air cylinder 40 for each mold part, each cylinder having a piston 41 therein which is connected by a piston rod 42 to the corresponding mold part, said cylinders being shown as mounted on suitable support members 40a. By this means, each mold part can be moved into its open position by moving the corresponding piston backwardly and can be moved forwardly into its closed position by moving the corresponding piston forwardly. Any suitable or usual valve device, not shown, may be used to direct compressed air into either end of each of the air cylinders for either mold in order to open and close the molds.

In the operation of the device, when one of the valves 16 is open, as shown at the right in Fig. 1, so that the thermoplastic material in its plastic condition can be fed through the open valve and the passageway 7 to the corresponding extrusion head, the corresponding mold will also be in the open condition as also shown at the right in Fig. 1. During this time, the other valve 16 will be closed and the corresponding mold will also be closed as shown at the left in Fig. 1. The thermoplastic material in its plastic condition will then be forced from the cylinder 6 through the open passage 7 and open valve 16 to the corresponding chamber 12 and through the extrusion opening to produce a tubular preform 29, which is delivered into the open mold as shown in Fig. 2. When sufficient plastic material has been extruded to form an extruded tube 29 of such material which extends through the open mold as shown in Fig. 3, then the open valve 16 is closed and the corresponding mold parts are closed together. The molds are so supported that in the opening and closing movement the top surface 50 at the open side of each mold part has a sliding contact with the bottom of the extrusion head. Each mold part is made with the usual cutting edge 51 at the bottom of its open side and hence the closing of the mold cuts off the leading end of the tubular section 29 of the plastic material as shown at 44 and the top surface of the mold also cuts off the upper end of said tubular section from the parent body of the plastic material at the bottom of the extrusion head, as shown in Fig. 3. The mandrel 13 has a duct 45 extending axially thereof and through the tip 46. This duct provides means by which after the mold is closed compressed air may be delivered into the preform to expand it to form a hollow article 43 having a shape determined by the contour of the single mold cavity, that is, a hollow article having a bottom defined by the bottom wall 62 of said single mold cavity, a side wall defined by the side wall 61 of said single mold cavity, and a top wall defined by the top wall 60 of said single mold cavity.

The top edge at the open side of each mold part is formed with a vertical recess 52 which extends from the top face of the mold part to the single mold cavity. The distance which the tip 46 projects below the extrusion head is less than the vertical dimension of said recesses. The upper portion of the walls of said recesses have a size and shape to fit tightly around the projecting end of said tip portion when the mold is closed thereby cutting off the tubular preform from the parent material in the extrusion opening, as stated above. Since the tip 46 terminates at a point between the top and bottom of said recesses, the lower portion of each recess is below the end of the tip and above the top of the cutoff preform. Hence, when the mold is closed, the walls of the lower portion of the recesses engage the upper end of the cutoff preform and reduce the diameter thereof to form the neck 47, as shown in Fig. 3, said neck having a central opening which is in register with the duct 45 through the mandrel.

After the mold has been thus closed, compressed air is admitted into the interior of the preform 29 through the duct 45 and through the opening in the neck 47 thereby to expand said preform to form the article having a shape corresponding to the shape of said single mold cavity. In the construction shown, this expanding of the preform will produce an article having a bottom defined by the bottom wall 62 of the mold cavity and will have a side wall defined by the side wall 61 of the mold cavity and will also have a top wall defined by the top wall 60 of the cavity. Said article will also have the tubular neck 47 projecting from the top wall of the completed article.

If desired, means may be provided for cooling the mold, thereby to hasten the cooling of the hollow article formed within the mold; and when the article has been sufficiently cooled and the plastic material has become solidified, then the mold is opened and the molded article 43 is removed. As soon as said article is removed, the corresponding valve is opened so that the extrusion operation can be repeated to produce another hollow article.

In machines of this type, it is common to provide suitable timing mechanism which times the opening and closing of the valves 16 and the movement of the mold parts between their open and closed positions so that while one valve 16 is open and thermoplastic material in plastic condition is being extruded through the corresponding extrusion head into an open mold, the other valve 16 will be closed and the other mold will also be closed and the extruded section 29 which had been previously extruded into said other mold will be expanded in the mold cavity thereof to produce a hollow article having a shape corresponding to that of the mold cavity in said other mold.

Inasmuch as such timing mechanism is well known and in common use, it is not deemed necessary to illustrate it in the drawings.

I claim:

A machine for molding hollow articles from thermoplastic material, said machine comprising a body member having a chamber to receive thermoplastic material, a tubular element secured to the lower end of said body member with the opening therethrough communicating with said chamber, a mandrel extending axially through both said chamber and said tubular member and forming with the latter an extrusion opening, said mandrel having at its lower end a cylindrical tip portion of reduced diameter which is smaller than the extrusion opening and which extends from a point above the bottom face of and within said tubular member to a point below and beyond said bottom face, a two-part mold beneath said extrusion opening, each part of said mold having a mold cavity and said mold parts being movable relative to each other to open and close the mold, means to extrude thermoplastic material from said chamber through said opening to produce a tubular preform and deliver it into an open mold, means to move said mold parts to closed position with the two adjacent faces of said mold parts in contact, each of said faces having a vertical recess extending from the top of the corresponding mold part to the mold cavity therein, said recesses being of a size and shape and situated to fit around the bottom part of said tip portion which projects below the said tubular element when the mold is closed and also being of a length to extend a distance below the lower end of said tip portion, whereby when the mold is closed the upper portion of said recesses cooperate with the projecting end of the tip portion to cut off the extruded preform in the space between the bottom of said tubular element and the bottom of said tip portion and the lower part of said recesses engage and contract the top end of the cut-off preform to form a short tubular neck portion, and means to deliver compressed air into the tubular preform through said tip portion and said neck thereby to expand such preform against the bottom, side, and top walls of the mold cavity to form a hollow article having a shape determined by the contour of the mold cavity and which has a short neck extending from its upper end.

References Cited in the file of this patent

UNITED STATES PATENTS

| | | |
|---|---|---|
| 2,632,202 | Haines | Mar. 24, 1953 |
| 2,644,983 | Curtiss | July 14, 1953 |
| 2,724,860 | Strong | Nov. 29, 1955 |
| 2,750,625 | Colombo | June 19, 1956 |

FOREIGN PATENTS

| | | |
|---|---|---|
| 163,661 | Australia | June 28, 1955 |
| 1,030,004 | France | Mar. 11, 1953 |